United States Patent
Ionel et al.

(10) Patent No.: US 7,148,598 B2
(45) Date of Patent: Dec. 12, 2006

(54) SPOKE PERMANENT MAGNET ROTORS FOR ELECTRICAL MACHINES AND METHODS OF MANUFACTURING SAME

(75) Inventors: Dan M. Ionel, Fox Point, WI (US); Robert J. Heideman, Kewaskum, WI (US); Ronald P. Bartos, Menomonee Falls, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 180 days.

(21) Appl. No.: 10/691,818

(22) Filed: Oct. 23, 2003

(65) Prior Publication Data
US 2005/0088052 A1     Apr. 28, 2005

(51) Int. Cl.
*H02K 1/27*     (2006.01)

(52) U.S. Cl. .................. 310/156.55; 310/156.38; 310/43; 29/598

(58) Field of Classification Search ................ 310/156.55–156.61, 156.38, 43, 45; 29/598
See application file for complete search history.

(56) References Cited

U.S. PATENT DOCUMENTS

| | | | | |
|---|---|---|---|---|
| 2,059,518 A | 11/1936 | Harley | ............... | 310/156.53 |
| 2,486,656 A | 11/1949 | Klinkhamer | ........... | 310/156.42 |
| 2,794,137 A | 5/1957 | Faus et al. | ............ | 310/156.45 |
| 2,927,229 A | 3/1960 | Merrill | ................ | 310/156.11 |
| 3,111,596 A | 11/1963 | Lovegrove | ............ | 310/156.12 |
| 3,210,582 A | 10/1965 | Miller | ................ | 310/156.42 |
| 3,344,325 A | 9/1967 | Sklaroff | ............... | 310/156.42 |
| 3,466,518 A | 9/1969 | Aylikei et al. | ......... | 310/156.42 |
| 3,513,341 A | 5/1970 | Gratzmuller | ........... | 310/156.69 |
| 3,555,324 A | 1/1971 | Lovegrove | ............ | 310/156.42 |
| 3,950,663 A | 4/1976 | Mead | ................. | 310/156.47 |
| 3,979,821 A * | 9/1976 | Noodleman | ............ | 29/598 |
| 4,143,289 A | 3/1979 | Williams | ............... | 310/156.42 |
| 4,614,888 A | 9/1986 | Mosher et al. | .......... | 310/261 |
| 4,631,807 A | 12/1986 | Kawada et al. | ........... | 29/598 |
| 4,725,750 A | 2/1988 | Welch | ................ | 310/156.49 |
| 4,741,094 A | 5/1988 | Denk et al. | ............ | 310/156.11 |
| 5,091,668 A * | 2/1992 | Cuenot et al. | ......... | 310/156.61 |
| 5,140,211 A | 8/1992 | Ucida | ................ | 310/156.61 |

(Continued)

FOREIGN PATENT DOCUMENTS

JP     06-038415     *  2/1994

(Continued)

OTHER PUBLICATIONS

Machine translation of Nozawa et al., JP 06-038415, "Permanent Magnet Type Rotor", Feb. 1994.*

(Continued)

*Primary Examiner*—Karl Tamai
(74) *Attorney, Agent, or Firm*—Michael Best & Friedrich LLP

(57) ABSTRACT

A rotor assembly for an electric motor includes a spoke permanent magnet rotor and a shaft connected thereto. The spoke permanent magnet rotor has an axis of rotation, permanent magnet material, and ferro-magnetic material. The permanent magnet material extends outwardly relative to the axis of rotation to form a plurality of outwardly extending spoke portions of permanent magnet material. The ferro-magnetic material is positioned adjacent to the outwardly extending spoke portions of permanent magnet material. The shaft supports the spoke permanent magnet rotor for rotation about the axis of rotation. The permanent magnet material may circumferentially surround the axis of rotation to form a center portion of permanent magnet material. Further, the axis of rotation may pass through the permanent magnet material. The spoke permanent magnet rotor may be formed using a compaction process and/or an injection molding process.

57 Claims, 5 Drawing Sheets

U.S. PATENT DOCUMENTS

| | | | | |
|---|---|---|---|---|
| 5,157,297 A | * | 10/1992 | Uchida | 310/156.61 |
| 5,191,256 A | | 3/1993 | Reiter, Jr. et al. | 310/156.49 |
| 5,200,662 A | | 4/1993 | Tagami et al. | 310/156.61 |
| 5,204,572 A | * | 4/1993 | Ferreira | 310/156.19 |
| 5,211,896 A | | 5/1993 | Ward et al. | 264/126 |
| 5,386,161 A | | 1/1995 | Sakamoto | 310/156.55 |
| 5,405,574 A | | 4/1995 | Chelluri et al. | 419/47 |
| 5,463,262 A | | 10/1995 | Uchida | 310/156.61 |
| 5,536,985 A | | 7/1996 | Ward et al. | 310/44 |
| 5,611,139 A | | 3/1997 | Chelluri et al. | 29/744 |
| 5,611,230 A | | 3/1997 | Chelluri et al. | 72/56 |
| 5,689,797 A | | 11/1997 | Chelluri et al. | 419/38 |
| 5,753,989 A | | 5/1998 | Syverson et al. | 310/156.54 |
| 6,156,264 A | | 12/2000 | Johnston et al. | 419/64 |
| 6,188,304 B1 | | 2/2001 | Skinner et al. | 336/107 |
| 6,273,963 B1 | | 8/2001 | Barber | 148/108 |
| 6,417,596 B1 | | 7/2002 | Schurter et al. | 310/261 |
| 6,432,554 B1 | | 8/2002 | Barber et al. | 428/553 |
| 6,437,474 B1 | | 8/2002 | Chu | 310/156.51 |
| 6,524,526 B1 | | 2/2003 | Barber | 419/66 |
| 6,889,419 B1 | | 5/2005 | Reiter, Jr. et al. | 29/596 |
| 2002/0047426 A1 | * | 4/2002 | Pop, Sr. | 310/156.08 |
| 2002/0192103 A1 | | 12/2002 | Barber et al. | 419/52 |
| 2003/0051614 A1 | | 3/2003 | Knoth et al. | 100/917 |
| 2003/0062792 A1 | | 4/2003 | Reiter, Jr. et al. | 310/156.56 |
| 2003/0214194 A1 | | 11/2003 | Carl, Jr. et al. | 310/156.09 |
| 2004/0004407 A1 | * | 1/2004 | Laurent et al. | 310/156.48 |

FOREIGN PATENT DOCUMENTS

| | | | |
|---|---|---|---|
| JP | 06-062541 | * | 3/1994 |
| JP | 07154935 | * | 6/1995 |
| JP | 07-203643 | * | 8/1995 |
| JP | 08-223832 | * | 8/1996 |
| JP | 2000-152534 | * | 5/2000 |
| JP | 2001359247 | * | 12/2001 |

OTHER PUBLICATIONS

Machine translation of 07-154,935 Sakamoto.*

* cited by examiner

180
SPOKE PERMANENT MAGNET ROTORS FOR ELECTRICAL MACHINES AND METHODS OF MANUFACTURING SAME

BACKGROUND OF THE INVENTION

The present invention relates to electric machines, and more particularly to spoke permanent magnet rotors for use in electric motors.

Spoke permanent magnet rotors generally include a plurality of permanent magnets radially arranged around a shaft. The permanent magnets are magnetized tangentially, through the thickness of the permanent magnet, either before or after insertion into the rotor. Magnetic flux generated by the permanent magnets is collected and concentrated by ferro-magnetic pole pieces. Often, the pole pieces are utilized to retain the permanent magnets.

Some examples of spoke permanent magnet rotors are disclosed in U.S. Pat. Nos. 4,631,807; 5,140,211; 5,157,297; 5,200,662; and 5,463,262.

Spoke permanent magnet rotors have a natural flux concentration capability because two circumferentially adjacent permanent magnets contribute to the air-gap flux for each rotor pole. This flux concentration capability allows the air-gap magnetic flux density to be higher than the flux density of each permanent magnet that contributes to the air-gap magnetic flux density. Accordingly, electric motors that include spoke permanent magnet rotors often have a high specific torque output. This translates to a smaller overall weight and lower material cost for a given rating of electric motor. Further, based on the radial arrangement of the permanent magnets, the permanent magnets are less likely to become demagnetized. Therefore, rated operation close to the maximum energy product is possible without the risk of demagnetization of the permanent magnets under fault conditions. Operation at a maximum energy product ensures optimum utilization of the permanent magnets. This translates to lower material costs for a given rating of electric motor.

Despite the above-mentioned advantages of spoke permanent magnet rotors, only a relatively small number of spoke permanent magnet rotors are produced worldwide. One limiting factor for high volume production is the complicated construction required to reduce or eliminate the permanent magnet flux leakage from the radially inward portions of the permanent magnets towards the magnetic shaft. Another limiting factor is the complicated construction required to retain the permanent magnets and the pole pieces in the rotor during normal operation of the electric motor. A new spoke type permanent magnet rotor that provides enhanced performance and reduced costs would be welcomed by those in the art.

SUMMARY OF THE INVENTION

The invention provides spoke permanent magnet rotors that provide enhanced performance and reduced costs.

In one embodiment, the invention provides a rotor assembly for an electric motor. The rotor assembly includes a spoke permanent magnet rotor and a shaft connected thereto. The spoke permanent magnet rotor has an axis of rotation, permanent magnet material, and ferro-magnetic material. The permanent magnet material circumferentially surrounds the axis of rotation to form a circumferentially surrounding portion of permanent magnet material. The permanent magnet material also extends outwardly relative to the axis of rotation to form a plurality of outwardly extending portions of permanent magnet material. The ferro-magnetic material is positioned adjacent to the outwardly extending portions of permanent magnet material. The shaft supports the spoke permanent magnet rotor for rotation about the axis of rotation.

In another embodiment, the invention provides a rotor assembly for an electric motor. The rotor assembly includes a permanent magnet rotor and a shaft connected thereto. The permanent magnet rotor has an axis of rotation, a center portion of permanent magnet material, a plurality of angularly spaced spoke portions of permanent magnet material that extend outwardly from the center portion of permanent magnet material, and ferro-magnetic material positioned between the angularly spaced spoke portions of permanent magnet material. The shaft supports the spoke permanent magnet rotor for rotation about the axis of rotation.

In another embodiment, the invention provides a rotor assembly for an electric motor. The rotor assembly includes a spoke permanent magnet rotor and a shaft connected thereto. The spoke permanent magnet rotor has an axis of rotation, permanent magnet material, and ferro-magnetic material. The permanent magnet material extends outwardly relative to the axis of rotation to form a plurality of outwardly extending spoke portions of permanent magnet material. The permanent magnet material includes permanent magnet powder compacted using an electromagnetic compaction process. The ferro-magnetic material is positioned adjacent to the outwardly extending spoke portions of permanent magnet material. The shaft supports the spoke permanent magnet rotor for rotation about the axis of rotation.

In another embodiment, the invention provides a method of constructing a rotor assembly for an electric motor. The method includes compacting permanent magnet powder and ferro-magnetic powder using an electromagnetic compaction process to form a spoke permanent magnet rotor, and supporting the spoke permanent magnet rotor on a shaft for rotation about an axis of rotation. The compacted permanent magnet powder forms a center portion of permanent magnet material and a plurality of spoke portions of permanent magnet material extending outwardly from the center portion of permanent magnet material. The compacted ferro-magnetic powder forms a plurality of pole pieces. Each pole piece is positioned between a respective set of circumferentially adjacent spoke portions of permanent magnet material.

In another embodiment, the invention provides a rotor assembly for an electric motor. The rotor assembly includes a spoke permanent magnet rotor and a shaft connected thereto. The spoke permanent magnet rotor has an axis of rotation, permanent magnet material, and ferro-magnetic material. The permanent magnet material extends outwardly relative to the axis of rotation to form a plurality of outwardly extending spoke portions of permanent magnet material. The ferro-magnetic material forms a plurality of pole pieces. Each pole piece is positioned between a set of circumferentially adjacent outwardly extending spoke portions of permanent magnet material. The permanent magnet material includes injection molded plastic bonded permanent magnet material. The shaft supports the spoke permanent magnet rotor for rotation about the axis of rotation.

In yet another embodiment, the invention provides a method of constructing a rotor assembly for an electric motor. The method includes providing ferro-magnetic pole pieces, injection molding plastic bonded permanent magnet material to form a spoke permanent magnet rotor, and supporting the spoke permanent magnet rotor on a shaft for rotation about an axis of rotation. The injection molded plastic bonded permanent magnet material forms a center portion of permanent magnet material and a plurality of spoke portions of permanent magnet material extending outwardly from the center portion of permanent magnet material. Each pole piece is positioned between a respective set of circumferentially adjacent spoke portions of permanent magnet material.

Further objects of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The present invention is further described with reference to the accompanying drawings, which show embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" are used broadly and encompass both direct and indirect mountings, connections, supports, and couplings. Further, "connected" and "coupled" are not restricted to physical or mechanical connections or couplings.

DETAILED DESCRIPTION

Figure 1:
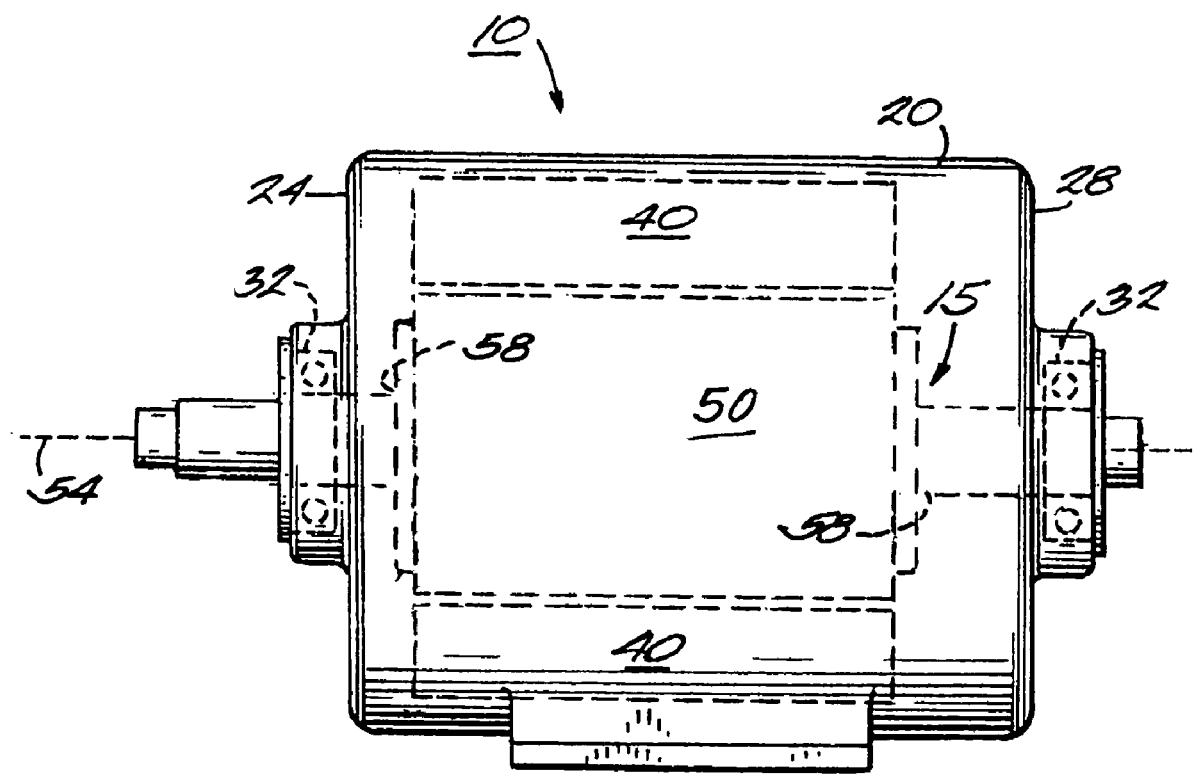
FIG. 1 is an schematic axial view of an electric motor including a spoke permanent magnet rotor assembly embodying the invention.

An electric motor 10 including a spoke permanent magnet rotor assembly 15 embodying the invention is schematically illustrated in FIG. 1. The specific motor embodiment shown is for exemplary purposes. The invention described herein may be used in any type of electric motor having a spoke permanent magnet rotor.

As illustrated in FIG. 1, the motor 10 includes a motor housing 20 with first and second ends 24 and 28. The motor housing 20 may include a plurality of pieces to accommodate assembly and maintenance. Mounted within each of the first and second ends 24 and 28 of the housing 20 is a respective bearing assembly 32. A stator 40 is mounted within the housing 20. For simplicity, the stator end-windings are not represented in FIG. 1. The spoke permanent magnet rotor assembly 15 is rotationally supported within the housing 20, such that the rotor assembly 50 may turn freely relative to the stator 40.

Figure 2:
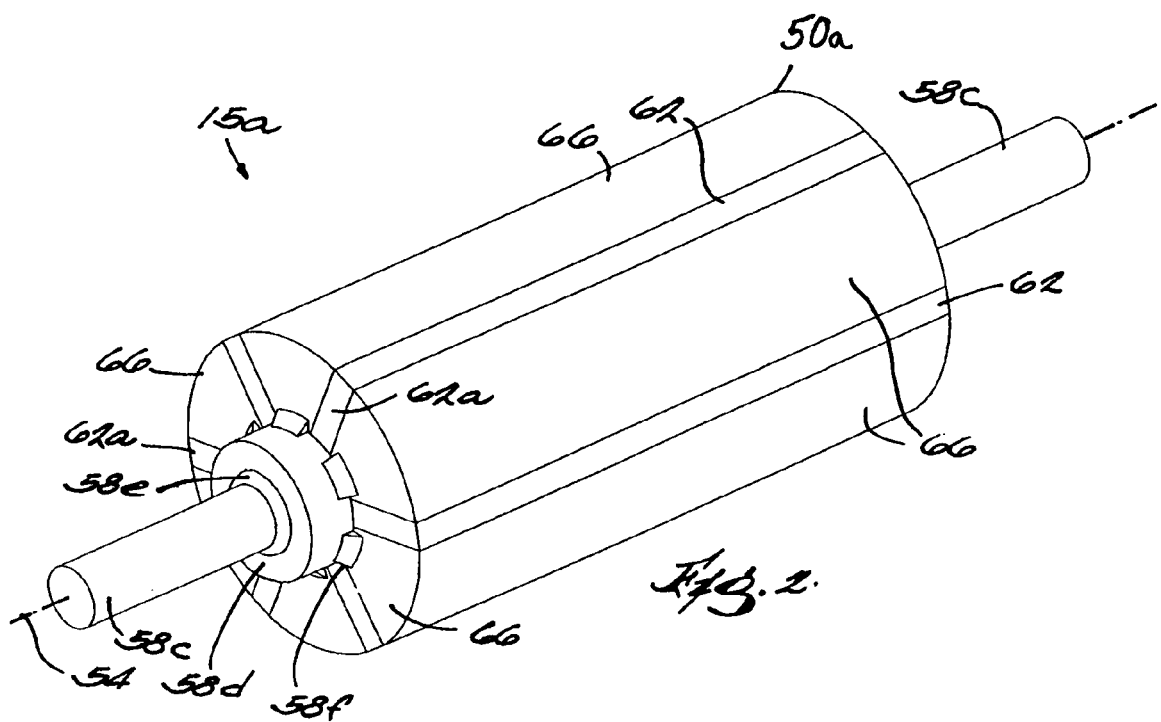
FIG. 2 illustrates a perspective view of a spoke permanent magnet rotor assembly according to a first construction of the invention.
Figure 3:
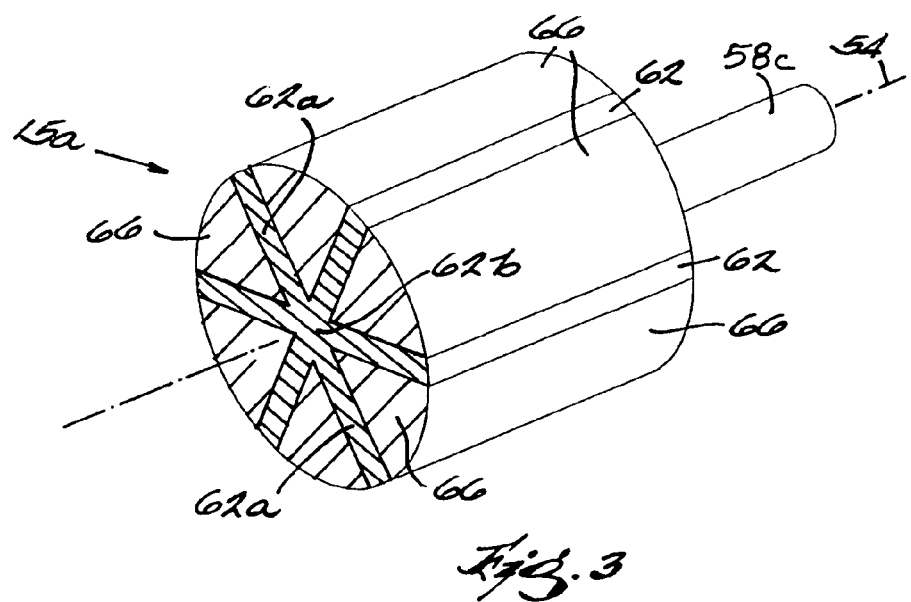
FIG. 3 illustrates a sectional perspective view of the spoke permanent magnet rotor assembly illustrated in FIG. 2.
Figure 4:
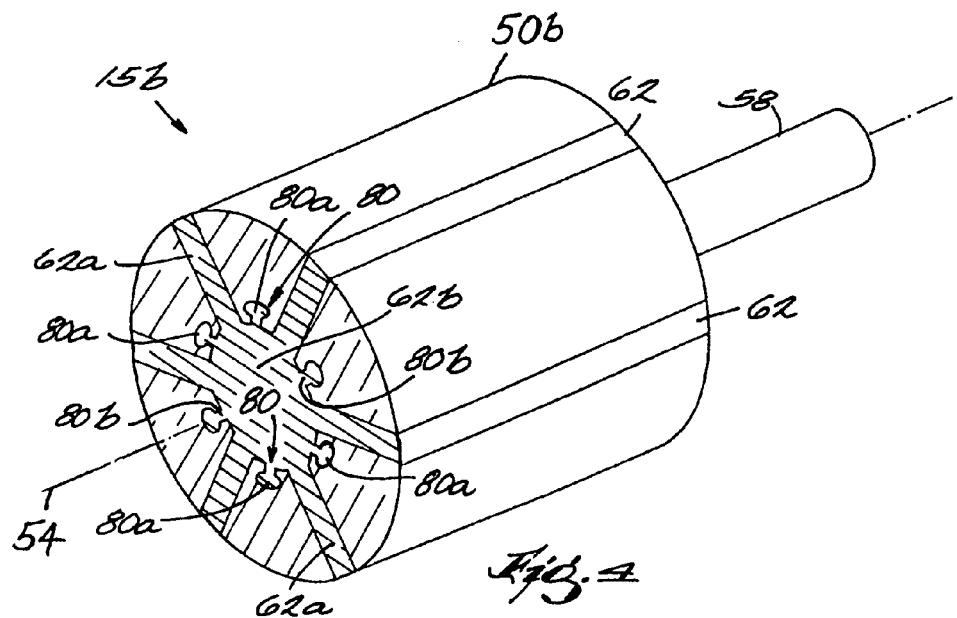
FIG. 4 illustrates a sectional perspective view of a spoke permanent magnet rotor assembly according to a second construction of the invention.
Figure 5:
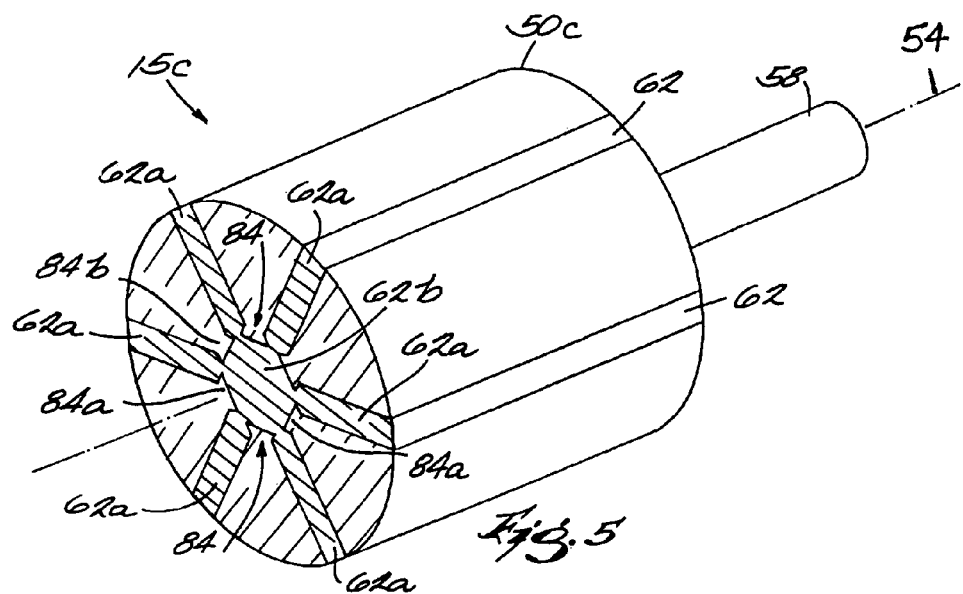
FIG. 5 illustrates a sectional perspective view of a spoke permanent magnet rotor assembly according to a third construction of the invention.
Figure 6:
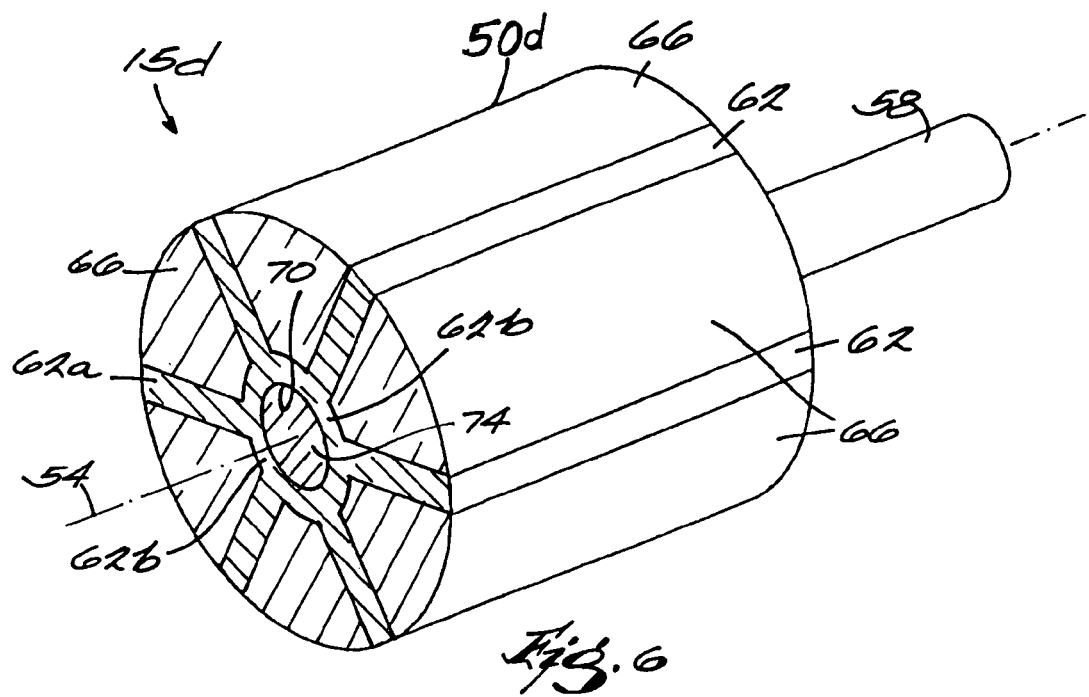
FIG. 6 illustrates a sectional perspective view of a spoke permanent magnet rotor assembly according to a fourth construction of the invention.
Figure 7:
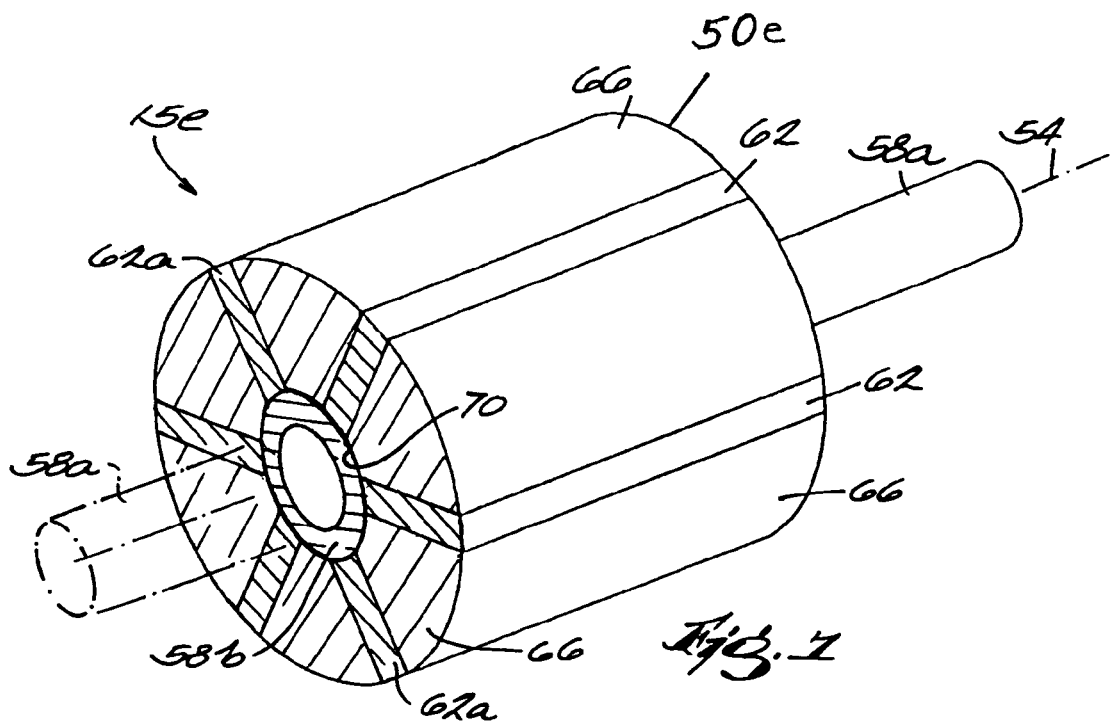
FIG. 7 illustrates a sectional perspective view of a spoke permanent magnet rotor assembly according to a fifth construction of the invention.

The rotor assembly 15 includes a spoke permanent magnet rotor 50 having an axis of rotation 54, and a shaft 58 to support the spoke permanent magnet rotor 50 for rotation about the axis of rotation 54. As discussed further below, the shaft 58 may include a through-shaft, a through-shaft assembly, stub shafts, stub shaft assemblies, and the like. A first construction of the spoke permanent magnet rotor assembly 15 is illustrated in FIGS. 2 and 3 as spoke permanent magnet rotor assembly 15a. The rotor assembly 15a includes a spoke permanent magnet rotor 50a. A second construction of the spoke permanent magnet rotor assembly 15 is illustrated in FIG. 4 as spoke permanent magnet rotor assembly 15b. The rotor assembly 15b includes a spoke permanent magnet rotor 50b. A third construction of the spoke permanent magnet rotor assembly 15 is illustrated in FIG. 5 as spoke permanent magnet rotor assembly 15c. The rotor assembly 15c includes a spoke permanent magnet rotor 50c. A fourth construction of the spoke permanent magnet rotor assembly 15 is illustrated in FIG. 6 as spoke permanent magnet rotor assembly 15d. The rotor assembly 15d includes a spoke permanent magnet rotor 50d. A fifth construction of the spoke permanent magnet rotor assembly 15 is illustrated in FIG. 7 as spoke permanent magnet rotor assembly 15e. The rotor assembly 15e includes a spoke permanent magnet rotor 50e. Like parts of each construction of the rotor assembly 15 are described and illustrated using like reference numerals.

Each spoke permanent magnet rotor 50 includes permanent magnet material 62 and ferro-magnetic material 66. The permanent magnet material 62 extends outwardly relative to the axis of rotation 54 to form a plurality of angularly spaced, outwardly extending spoke portions of permanent magnet material 62a. In each of the illustrated constructions, the outwardly extending spoke portions of permanent magnet material 62a extend radially outward relative to the axis of rotation 54 to form a plurality of angularly spaced, radially extending spoke portions of permanent magnet material 62a. In other constructions, the outwardly extending spoke portions 62a may not extend radially outward relative to the axis of rotation 54. Further, in each of the illustrated constructions, the radially extending spoke portions of permanent magnet material 62a extend to the perimeter of the spoke permanent magnet rotor 50, and are therefore visible along the generally cylindrical exterior surface of the rotor 50. In other constructions, the radially extending spoke portions 62a may not extend to the perimeter of the rotor 54.

For the spoke permanent magnet rotors 50a, 50b, 50c, and 50d, the permanent magnet material 62 also circumferentially surrounds the axis of rotation 58 (i.e., the permanent magnet material 62 surrounds or encircles the entire axis of rotation 58 at some radial position) to form a circumferentially surrounding portion of permanent magnet material 62b. Each circumferentially surrounding portion of permanent magnet material 62b extends from a first radial position to a second radial position spaced from and outward of the first radial position. The distance between the first and second radial positions, and thus the thickness of the circumferentially surrounding portion of permanent magnet material 62b, may vary.

For the spoke permanent magnet rotors 15a, 15b, and 15c, the first radial position is positioned substantially adjacent the axis of rotation 54, and the second radial position is positioned substantially adjacent the radially innermost portion of ferro-magnetic material 66. In constructions where the first radial position is positioned substantially adjacent the axis of rotation 54, the axis of rotation 54 often extends through the permanent magnet material 62 (i.e., the permanent magnet material 62 extends along at least a portion of the axis of rotation) to form a center portion of permanent magnet material that is solid. The solid center portion of permanent magnet material includes the circumferentially surrounding portion of permanent magnet material 62b and the portion of permanent magnet material through which the axis of rotation 54 extends.

For the spoke permanent magnet rotor 15d and with respect to the rotor cross section, the first radial position is spaced radially from the axis of rotation 54, and the second radial position is positioned substantially adjacent the radially inner most portion of ferro-magnetic material 66. In constructions where the first radial position is spaced from the axis of rotation 54, the first radial position is often positioned substantially adjacent the radially outermost portion of a center hole 70. The center hole 70 may be formed or machined in the rotor 50. Further, the center hole 70 may be of any shape and size.

The center hole 70 may accommodate a respective shaft 58 (e.g., a through-shaft, a through-shaft assembly). A center portion of permanent magnet material may include the circumferentially surrounding portion of permanent magnet material 62b that surrounds the shaft 58. The center hole 70 may remain open to form a hollow portion along the axis of rotation 54. In some embodiments, the axis of rotation 54 extends through the hollow portion. A center portion of permanent magnet material may include the circumferentially surrounding portion of permanent magnet material 62b and the hollow portion. The center hole 70 may be at least partially filled with either a non-magnetic material and/or another material to form a center core or core portion 74 (FIG. 6). A center portion of permanent magnet material may include the circumferentially surrounding portion of permanent magnet material 62b that surrounds the center core 74.

The ferro-magnetic material 66 forms pole pieces. Generally, a pole piece is positioned between each set of circumferentially adjacent radially extending portions of permanent magnet material 62. The pole pieces collect and concentrate the magnetic flux generated by the magnetized permanent magnet material 62. In some construction, the pole pieces each include at least one interface surface that prevents movement between the pole piece and the adjacent permanent magnet material 62. Such construction enhances rotor structure integrity and mechanical strength. For example, the pole pieces of the spoke permanent magnet rotors 15b and 15c each include an interface surface.

With reference to FIG. 4, the interface surfaces of the pole pieces of the spoke permanent magnet rotor 15b each include a recess interface surface that forms a recess 80 having a main portion 80a and a throat portion 80b. The throat portion 80b is narrower than the main portion 80a. The permanent magnet material 62 includes corresponding interface surfaces that engage the recess interface surfaces of the pole pieces.

With reference to FIG. 5, the interface surfaces of the pole pieces of the spoke permanent magnet rotor 15c each include a dovetail interface surface that forms a dovetail 84 having a main portion 84a and a throat portion 84b. The throat portion 84b is narrower than the main portion 84a. The permanent magnet material 62 includes corresponding interface surfaces that engage the dovetail interface surfaces of the pole pieces. The interface surfaces of the pole pieces and/or the permanent magnet material may be alternatively sized and/or shaped in other constructions.

In some constructions (e.g., the spoke permanent magnet rotors 50a, 50d, and 50e), the rotor 50 may be formed from ferro-magnetic and permanent magnet powders that are compacted using a dynamic magnetic compaction process, or a similar type of electromagnetic compaction process. The dynamic magnetic compaction process is generally explained in U.S. Pat. Nos. 5,405,574; 5,611,139; 5,611,230; 5,689,797; 6,273,963; 6,432,554; and 6,524,526; and U.S. Patent Application Publication No. 2002/0192103 and 2003/0051614; each of which are assigned to IAP Research of Dayton, Ohio and are incorporated by reference herein. In one embodiment of the dynamic magnetic compaction process, the ferro-magnetic and permanent magnet powers are loaded into an electrically conductive container (e.g., a container constructed of copper, steel, or aluminum) for simultaneous compaction. Specific reference is made to the above referenced U.S. Patent Application Publication No. 2002/0192103 which discloses a system and method for loading a plurality of powder materials in to an electromagnetic compaction press for simultaneous compaction. In other embodiments of the dynamic magnetic compaction process, the ferro-magnetic powder or the permanent magnet power is loaded into an electrically conductive container for individual compaction. For each embodiment, the loaded container is placed at the center of an electromagnetic coil. A current pulse is put through the coil, creating high magnetic pressure radially around the container. As the container collapses around the powder, the powder is compressed into a high density, near-net shape rotor 50. Dies can also be placed within the container to form rotor features around the dies (e.g., a center hole, interface surfaces, and the like).

Electromagnetic compaction can be done at a variety of temperatures (e.g., room temperature, temperatures elevate above room temperature) and in a variety of environments (e.g., air, special atmospheres). After the rotor 50 is compacted, it can be sintered to improve its strength. For some applications, however, the rotors 50 are strong enough that the sintering step can be omitted.

In other constructions (e.g., the spoke permanent magnet rotors 50b and 50c), the rotor 50 may be formed of ferro-magnetic pole pieces and plastic bonded permanent magnet material injection molded around the pole pieces using an injection molding process. The ferro-magnetic pole pieces may be formed of ferro-magnetic laminations (e.g., interlocking ferro-magnetic laminations, bonded together ferro-magnetic laminations, ferro-magnetic laminations secured using fasteners extending there through, and the like), solid ferro-magnetic material (e.g., solid steel), and/or composite ferro-magnetic materials. The ferro-magnetic pole pieces are placed in a fixture and the plastic bonded permanent magnet material (e.g., NdFeB, ferrite, and the like) is injection molded into the voids left in the fixture to produce a rotor 50. Utilization of pole pieces having interface surfaces allows for the creation of corresponding interface surfaces in the plastic bonded permanent magnet material during the injection molding process. Engagement between the interface surfaces of the pole pieces and the plastic bonded permanent magnet material increases the structural integrity of the rotor 50. In other embodiments, the plastic bonded permanent magnet material may be molded in a fixture to produce structure to which ferro-magnetic pole pieces are later added.

In other constructions, the rotor 50 may be formed of blocks of permanent magnet material and soft magnetic particles of ferro-magnetic material (e.g., iron particles coated with a non-magnetic binder such as a thermoplastic or resin so that the iron particles are space separated and bound together by the non-magnetic binder) molded around the pieces of permanent magnet material. In one embodiment, the pieces of permanent magnet material are placed in a fixture and the soft magnetic particles of ferro-magnetic material is molded into the voids of the fixture to produce a rotor 50. In other embodiments, the soft magnetic particles of ferro-magnetic material may be molded in a fixture to produce a rotor core to which pieces of permanent magnet material are later added. A molding process that utilizes soft magnetic particles of ferro-magnetic material is disclosed in U.S. Pat. No. 5,536,985, which is assigned to General Motors Corporation of Detroit, Mich. and is incorporated by reference herein.

In yet other constructions, the rotor 50 may be formed using other methods, or a combination of any number of the above described methods (e.g., the pole pieces may be formed of ferro-magnetic powder using an electromagnetic compaction process or a mechanical pressing and sintering process, and the permanent magnet material 62 then injection molded around the pole pieces).

The spoke permanent magnet rotor 50 may be attached to the shaft 58 during and/or after construction of the rotor 50. In some embodiments, the shaft 58 includes an axis of rotation that is collinear with the axis of rotation of the spoke permanent rotor 50.

Figure 8:
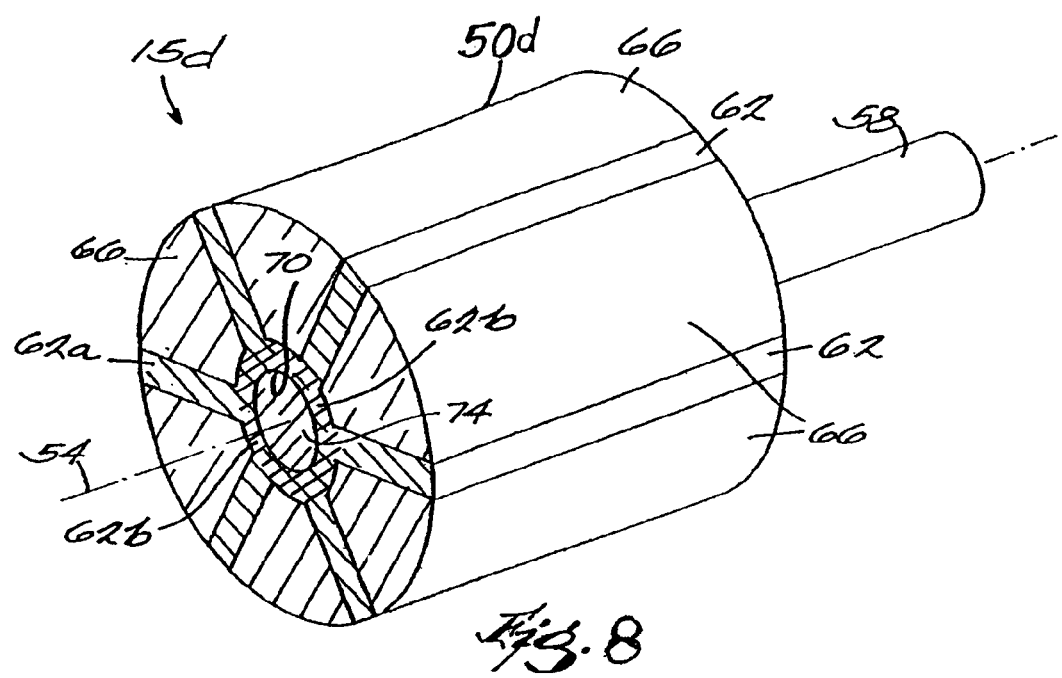
FIG. 8 is a sectional perspective view of the rotor of FIG. 6 illustrating the magnetized and non-magnetized portions of permanent magnet material.

In some construction, a magnetic or non-magnetic through-shaft extends through the center hole 70 of a respective rotor 50. To reduce or eliminate leakage magnetic flux from the magnetized permanent magnet material 62 toward a magnetic shaft, a sleeve of non-magnetic material may be positioned radially inward of the permanent magnet material 62 and radially outward of the magnetic shaft. In one construction, as illustrated in FIG. 7, a through-shaft assembly including a magnetic shaft 58a and a non-magnetic sleeve 58b surrounding at least a portion of the magnetic shaft 58a is utilized. In other constructions, at least a portion of a circumferentially surrounding portion of permanent magnet material 62b may remain unmagnetized to act as a non-magnetic material. For example, FIG. 8 illustrates a construction in which the circumferential portion 62b (cross-hatched in an X-pattern) is substantially non-magnetized, while the spokes 62a are magnetized.

In other constructions, magnetic or non-magnetic stub shafts are connected directly to the rotor 50. The stub shafts may be connected using any suitable means (e.g., welding, gluing, adhering, and the like). In yet other constructions, magnetic or non-magnetic stub shaft assemblies are connected directly to the rotor 50. The stub shaft assemblies may be connected using any suitable means (e.g., welding, gluing, adhering, through-bolts, and the like). In one construction, as illustrated in FIG. 2, a stub shaft assembly, including a stub shaft 58c and an end plate 58d, is connected to each end of the rotor 50. The stub shafts 58c are connected to the end plates 58d by a friction weld 58e, and the end plates 58d are connected directly to each end of the rotor 50 by welds 58f. In other constructions, the stub shaft may be integrally connected to the end plate. Other types of stub shafts and/or end plates may be utilized to support the rotor 50 for rotation relative to the stator in other constructions. Generally, to minimize negative end-field effects during in-situ magnetization of the rotor assembly 15 and during motor operation, the end plates are formed of a non-magnetic and non-electrically conductive material. In some constructions, the end plates may be formed of a different material if the outside diameter of the end plate is substantially smaller in comparison to the outside diameter of the rotor 50 (FIG. 1). When stub shafts and stub shaft assemblies are utilized, the axis of rotation of the spoke permanent magnet rotor 50 may extend through the permanent magnet material 62, or the spoke permanent magnet rotor 50 may include a center hole 70 or a center core 74 filled with a magnetic or non-magnetic material. The rotor 50 may be magnetized using a conventional magnetizer and fixture.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A rotor assembly for an electric motor, the rotor assembly comprising:

a spoke permanent magnet rotor having an axis of rotation, and comprising a single body of permanent magnet material continuously circumferentially surrounding the axis of rotation to define a circumferential portion, and continuously radially extending outwardly relative to the axis of rotation to form a plurality of outwardly extending portions, the circumferential portion defining a first interface surface, and ferro-magnetic material positioned adjacent to the outwardly extending portions of permanent magnet material and including an outer surface and a second interface surface formed inward of the outer surface that engages the first interface surface, the first interface surface and second interface surface arranged to inhibit outward radial motion of the ferro-magnetic material.

2. A rotor assembly as claimed in claim 1 wherein the outwardly extending portions of permanent magnet material extend radially outward to the perimeter of the spoke permanent magnet rotor.

3. A rotor assembly as claimed in claim 1 wherein the ferro-magnetic material includes ferro-magnetic laminations.

4. A rotor assembly as claimed in claim 1 wherein the ferro-magnetic material includes ferro-magnetic powder compacted using a compaction process.

5. A rotor assembly as claimed in claim 1 wherein the permanent magnet material includes permanent magnet powder compacted using a compaction process.

6. A rotor assembly as claimed in claim 1 wherein the ferro-magnetic material includes ferro-magnetic powder compacted using an electromagnetic compaction process, and wherein the permanent magnet material includes permanent magnet powder compacted simultaneously with the ferro-magnetic powder using the electromagnetic compaction process.

7. A rotor assembly as claimed in claim 1 wherein the ferro-magnetic material forms a plurality of pole pieces, and wherein the permanent magnet material includes plastic bonded permanent magnet material molded around the pole pieces.

8. A rotor assembly as claimed in claim 1 wherein the ferro-magnetic material forms a plurality of pole pieces, and wherein each of the plurality of pole pieces includes an interface surface that prevents movement between the respective pole piece and the permanent magnet material adjacent to the respective pole piece.

9. A rotor assembly as claimed in claim 8 wherein the interface surface includes a dovetail interface surface that forms a dovetail.

10. A rotor assembly as claimed in claim 8 wherein the interface surface includes a recess interface surface that forms a recess having a main portion and a throat portion, and wherein the throat portion is narrower than the main portion.

11. A rotor assembly as claimed in claim 8 wherein the ferro-magnetic material defines a plurality of separate pole pieces.

12. A rotor assembly as claimed in claim 1 wherein the axis of rotation extends through the permanent magnet material.

13. A rotor assembly as claimed in claim 1 further comprising a shaft supporting the spoke permanent magnet rotor for rotation about the axis of rotation.

14. A rotor assembly as claimed in claim 13 wherein the shaft includes a first stub shaft and a second stub shaft, the first and second stub shafts each having an axis of rotation collinear with the axis of rotation of the spoke permanent magnet rotor, wherein the spoke permanent magnet rotor includes a first end and a second end, and wherein the first stub shaft is connected to the first end and the second stub shaft is connected to the second end.

15. A rotor assembly as claimed in claim 14 wherein the shaft also includes a first end plate and a second end plate, wherein the first end plate is connected to the first end between the spoke permanent magnet rotor and the first stub shaft, and wherein the second end plate is connected to the second end between the spoke permanent magnet rotor and the second stub shaft.

16. A rotor assembly as claimed in claim 1 wherein the circumferentially surrounding portion of permanent magnet material extends from a first radial position to a second radial position spaced from and outward of the first radial position, wherein the first radial position is positioned substantially adjacent the axis of rotation, and wherein the second radial position is positioned substantially adjacent the radially innermost portion of ferro-magnetic material.

17. A rotor assembly as claimed in claim 1 wherein the circumferentially surrounding portion of permanent magnet material extends from a first radial position to a second radial position spaced from and outward of the first radial position, wherein the first radial position is spaced from the axis of rotation, and wherein the second radial position is positioned substantially adjacent the radially inner most portion of ferro-magnetic material.

18. A rotor assembly as claimed in claim 17 wherein the first radial position is positioned substantially adjacent to an outermost portion of a hollow portion, and wherein the axis of rotation extends through the hollow portion.

19. A rotor assembly as claimed in claim 17 wherein the first radial position is positioned substantially adjacent to an outermost portion of a core portion, wherein the axis of rotation extends through the core portion, and wherein the core portion includes at least one of a magnetic material and a non-magnetic material.

20. The rotor assembly as claimed in claim 1 wherein the permanent magnet material circumferentially surrounding the axis of rotation is not magnetized and the permanent magnet material extending substantially radially relative to the axis of rotation is magnetized.

21. The rotor assembly as claimed in claim 1 wherein the permanent magnet material circumferentially surrounding the axis of rotation directly contacts the shaft.

22. A rotor assembly for an electric motor, the rotor assembly comprising:
a permanent magnet rotor having an axis of rotation, a portion of permanent magnet material that surrounds a portion of the axis of rotation and includes at least a portion that is not magnetized, a plurality of angularly spaced spoke portions of permanent magnet material that extend outwardly from the portion of permanent magnet material and are magnetized and ferro-magnetic material positioned between the angularly spaced spoke portions of permanent magnet material; and
a shaft supporting the permanent magnet rotor for rotation about the axis of rotation.

23. A rotor assembly as claimed in claim 22 wherein the center portion of permanent magnet material includes a hollow portion, and wherein the axis of rotation extends through the hollow portion.

24. A rotor assembly as claimed in claim 22 wherein the center portion of permanent magnet material surrounds a core portion, wherein the axis of rotation extends through the core portion, and wherein the core portion includes a non-magnetic material.

25. A rotor assembly as claimed in claim 22 wherein the center portion of permanent magnet material is solid.

26. A rotor assembly as claimed in claim 22 wherein the permanent magnet material and the ferro-magnetic material have an interface therebetween that prevents the ferro-magnetic material adjacent to the interface from moving outwardly during rotation of the spoke permanent magnet rotor about the axis of rotation.

27. A rotor assembly as claimed in claim 22 wherein, the permanent magnet material includes permanent magnet powder compacted using an electromagnetic compaction process.

28. The rotor assembly as claimed in claim 27 wherein the permanent magnet material circumferentially surrounding the axis of rotation directly contacts the shaft.

29. A rotor assembly as claimed in claim 27 wherein the ferro-magnetic material includes ferro-magnetic powder compacted simultaneously with the permanent magnet powder using the electromagnetic compaction process.

30. A rotor assembly as claimed in claim 29 wherein the electromagnetic compaction process produces a composite structure.

31. A rotor assembly as claimed in claim 22 wherein the shaft includes a through-shaft assembly having a magnetic through-shaft and a non-magnetic sleeve surrounding at least a portion of the magnetic through-shaft, and wherein the outwardly extending spoke portions of permanent magnet material extend radially outward from the non-magnetic sleeve.

32. A rotor assembly as claimed in claim 22 wherein the permanent magnet material circumferentially surrounds the axis of rotation to form a circumferentially surrounding portion of permanent magnet material.

33. A rotor assembly as claimed in claim 32 wherein the axis of rotation passes through the permanent magnet material.

34. A rotor assembly as claimed in claim 22 wherein the permanent magnet material forms a center portion of permanent magnet material, and wherein the outwardly extending spoke portions of permanent magnet material extend radially outward from the center portion of permanent magnet material.

35. A rotor assembly as claimed in claim 22 wherein bolts do not extend through the ferro-magnetic material.

36. The rotor assembly as claimed in claim 22 wherein the permanent magnet material circumferentially surrounding the axis of rotation directly contacts the shaft.

37. A rotor assembly as claimed in claim 22 wherein the spoke portions are tangentially magnetized.

38. A rotor assembly as claimed in claim 22 wherein the spoke portions extend to an outer perimeter of the rotor.

39. A rotor assembly as claimed in claim 22 wherein the ferro-magnetic material defines a plurality of separate pole pieces.

40. A rotor assembly for an electric motor, the assembly comprising:
   a spoke permanent magnet rotor having an axis of rotation, permanent magnet material having a portion that continuously surrounds a portion of the axis of rotation to define a circumferential portion, and portions extending outwardly relative to the axis of rotation to form a plurality of outwardly extending spoke portions of permanent magnet material, the permanent magnet material defining a plurality of interface surfaces, each interface surface disposed between adjacent outwardly extending spoke portions, and ferro-magnetic material forming a plurality of pole pieces, each pole piece being positioned between a set of circumferentially adjacent outwardly extending spoke portions of permanent magnet material and including a pole interface surface engageable with one of the plurality of interface surfaces to inhibit outward radial movement of the pole piece, the permanent magnet material including molded plastic bonded permanent magnet material; and
   a shaft supporting the spoke permanent magnet rotor for rotation about the axis of rotation.

41. A rotor assembly as claimed in claim 40 wherein the plastic bonded permanent magnet material is molded around the pole pieces in an injection molding process.

42. A rotor assembly as claimed in claim 40 wherein at least one pole piece includes an interface surface that prevents movement between the at least one pole piece and the permanent magnet material adjacent to the at least one pole piece.

43. A rotor assembly as claimed in claim 40 wherein the permanent magnet material circumferentially surrounds the axis of rotation to form a circumferentially surrounding portion of permanent magnet material.

44. A rotor assembly as claimed in claim 43 wherein the axis of rotation passes through the permanent magnet material.

45. A rotor assembly as claimed in claim 40 wherein the permanent magnet material forms a center portion of permanent magnet material, and wherein the outwardly extending spoke portions of permanent magnet material extend radially outward form the center portion of permanent magnet material.

46. A rotor assembly as claimed in claim 40 wherein bolts do not extend through the pole pieces.

47. The rotor assembly as claimed in claim 40 wherein the portion of permanent magnet material that continuously surrounds a portion of the axis of rotation includes at least a portion that is not magnetized, and the the outwardly extending portions of permanent magnet material are magnetized.

48. A rotor assembly as claimed in claim 47 wherein the spoke portions are tangentially magnetized.

49. The rotor assembly as claimed in claim 40 wherein the permanent magnet material circumferentially surrounding the axis of rotation directly contacts the shaft.

50. A rotor assembly as claimed in claim 40 wherein the plurality of pole pieces are separate from one another.

51. A rotor assembly for an electric machine having an axis of rotation, the rotor assembly comprising:
   a single body of permanent magnet material defining a circumferential portion that surrounds the axis of rotation and includes a substantial portion that is not magnetized, and a plurality of spoke portions extending radially outward from the circumferential portion, each of the spoke portions being tangentially magnetized;
   a plurality of pole pieces, each disposed between two adjacent spoke portions and coupled to the permanent magnet material such that the permanent magnet material inhibits the outward radial movement of the pole pieces; and
   a core portion disposed within the circumferential portion.

52. A rotor assembly as claimed in claim 51 wherein the pole pieces are separate.

53. A rotor assembly as claimed in claim 52 wherein the spoke portions extend to an outer perimeter of the rotor.

54. A rotor assembly as claimed in claim 52 wherein the poles pieces are coupled to both the circumferential portion and the adjacent spoke portions.

55. A rotor assembly as claimed in claim 54 further comprising a shaft with an axis coinciding with the longitudinal axis of the circumferential portion or the body of permanent magnet material.

56. A rotor assembly as claimed in claim 54 wherein the permanent magnet material and the pole pieces are attached to one another using a dynamic magnetic compaction process to define a composite rotor.

57. A rotor assembly as claimed in claim 54 wherein the permanent magnet material includes a molded plastic portion bonded with the pole pieces.

* * * * *